(12) United States Patent
Cao et al.

(10) Patent No.: US 11,374,267 B2
(45) Date of Patent: Jun. 28, 2022

(54) FORMATION CAPACITY-GRADING DEVICE FOR CYLINDRICAL LITHIUM ION BATTERY

(71) Applicant: ZHEJIANG HANGKE TECHNOLOGY INCORPORATED COMPANY, Hangzhou (CN)

(72) Inventors: Ji Cao, Hangzhou (CN); Zheng Cao, Hangzhou (CN); Hongyu Sang, Hangzhou (CN)

(73) Assignee: ZHEJIANG HANGKE TECHNOLOGY INCORPORATED COMPANY, Hangzhou (CN)

( * ) Notice: Subject to any disclaimer, the term of this patent is extended or adjusted under 35 U.S.C. 154(b) by 209 days.

(21) Appl. No.: 16/633,162

(22) PCT Filed: Sep. 19, 2019

(86) PCT No.: PCT/CN2019/106561
§ 371 (c)(1),
(2) Date: Jan. 23, 2020

(87) PCT Pub. No.: WO2020/103553
PCT Pub. Date: May 28, 2020

(65) Prior Publication Data
US 2021/0210800 A1    Jul. 8, 2021

(30) Foreign Application Priority Data
Nov. 22, 2018  (CN) .......................... 201811399062.9

(51) Int. Cl.
*H01M 6/12* (2006.01)
*H01M 10/44* (2006.01)
(Continued)

(52) U.S. Cl.
CPC ..... *H01M 10/441* (2013.01); *H01M 10/0525* (2013.01); *H01M 10/486* (2013.01);
(Continued)

(58) Field of Classification Search
CPC .. H01M 10/441; H01M 10/44; H01M 10/448; H01M 10/63; H01M 10/65;
(Continued)

(56) References Cited

U.S. PATENT DOCUMENTS

| 6,782,605 B1* | 8/2004 | Stocchiero | ............ | H01M 50/60 29/726 |
| 2003/0037431 A1* | 2/2003 | Benson | ............. | H01M 10/0404 29/623.1 |

FOREIGN PATENT DOCUMENTS

DE         102017203957      *  9/2018  ............. B65G 49/00

* cited by examiner

*Primary Examiner* — Raymond Alejandro (57) ABSTRACT

A formation capacity-grading equipment for a cylindrical lithium-ion battery comprises a rack, a charge and discharge power box for charging and discharging the cylindrical lithium-ion battery, a battery clamping mechanism for clamping the positive and negative electrodes of the cylindrical lithium-ion battery, a battery tray for placing the cylindrical lithium-ion battery, and a controller, wherein the rack is provided with several layers of work stations for formation and capacity grading of the battery; the charge and discharge power box and the battery clamping mechanisms are provided at each layer of the work stations; a power transmission end of the charge and discharge power box is electrically connected to a power transmission end of the battery clamping mechanism; and a control end of the charge and discharge power box and a control end of the battery clamping mechanism are in signal connection respectively with a signal transmission port of the controller.

11 Claims, 10 Drawing Sheets

(51) Int. Cl.
  *H01M 10/63* (2014.01)
  *H01M 10/6563* (2014.01)
  *H01M 50/264* (2021.01)
  *H01M 50/213* (2021.01)
  *H01M 10/0525* (2010.01)
  *H01M 10/48* (2006.01)

(52) U.S. Cl.
  CPC ....... *H01M 10/63* (2015.04); *H01M 10/6563* (2015.04); *H01M 50/213* (2021.01); *H01M 50/264* (2021.01)

(58) Field of Classification Search
  CPC ......... H01M 10/6563; H01M 10/6561; H01M 10/655; H01M 10/0525; H01M 10/486; H01M 10/48; H01M 50/264; H01M 50/213; H01M 50/202; H01M 50/262
  See application file for complete search history.

FORMATION CAPACITY-GRADING DEVICE FOR CYLINDRICAL LITHIUM ION BATTERY

TECHNICAL FIELD

The present invention relates to a formation capacity-grading equipment for a cylindrical lithium ion battery.

BACKGROUND

In the production process of cylindrical lithium ion batteries, formation and capacity grading are important procedures. The formation is to activate the internal activity of the battery by electrical energy to form an SEI film on the negative electrode of the battery. A high-quality formation equipment can ensure that the battery has good charge and discharge performance and cycle life. Capacity grading comprises performing several full-load charge and discharge cycles on the activated batteries, to test the internal DC resistance, the charge and discharge voltage, the constant-current discharge, constant-voltage discharge, and constant-power discharge characteristics, and grouping to select the batteries having the same electrical parameters for use after serial or parallel connection, thereby reducing the Buckets effect of the batteries after combination.

SUMMARY

Taking into account the frequently occurring problems that affect the quality of the battery and the safety of production in the current formation and capacity grading processes of cylindrical lithium ion battery, for example, the large temperature difference in the tray due to heat generation during the charge and discharge process, which seriously affects the accuracy of the battery capacity test, and battery abnormality or fire caused by battery defects or equipment defects, an object of the present invention is to provide a safe, effective, and fire-protection formation capacity-grading equipment for a cylindrical lithium-ion battery.

The formation capacity-grading equipment for a cylindrical lithium-ion battery according to the present invention comprises a rack, a charge and discharge power box for charging and discharging the cylindrical lithium-ion battery, a battery clamping mechanism for clamping the positive and negative electrodes of the cylindrical lithium-ion battery, a battery tray for placing the cylindrical lithium-ion battery, and a controller, where the rack is provided with, from top to bottom, several layers of work stations for formation and capacity grading of the battery; the charge and discharge power box and the battery clamping mechanisms are provided at each layer of the work stations; a power transmission end of the charge and discharge power box is electrically connected to a power transmission end of the battery clamping mechanism; and a control end of the charge and discharge power box and a control end of the battery clamping mechanism are in signal connection respectively with a signal transmission port of the controller, to enable the control over the charge and discharge power box and the battery clamping mechanism by the controller.

The charge and discharge power box comprises a power chassis, an electronic circuit, a control unit board, a drive power board, an auxiliary working power of the system, a power inverter with bidirectional flow and conversion capability between AC and DC, and a cooling fan, where the electronic circuit, the drive power board, the control unit board, the auxiliary working power of the system, the power inverter and the cooling fan are all arranged in the power chassis, and the control unit board is provided on the drive power board; the electronic circuit, the drive power board, the auxiliary working power of the system and are respectively electrically connected to the control unit board; the control unit board is in bidirectional signal connection with controller via an interface communication board; a signal transmission end of the drive power board is in signal connection with a signal transmission port of the power inverter; an air outlet of the cooling fan faces toward the outside of the rack, and a control end of the cooling fan is electrically connected to a signal output of the controller for cooling the components in the rack.

The electronic circuit comprises a DC/DC power supply enabling bidirectional current flow for charging and discharging a single-cell lithium ion battery, a safety protection reference resistor, a charge and discharge constant-current control loop subjected to precise control, a charge and discharge constant-voltage control loop, and a main-reference and fine-tune-reference combiner circuit.

The drive power board comprises a multi-channel programmed DC/DC unit, a voltage and current monitoring and protection unit, a heat sink, and a constant current and constant voltage control circuit, where the multi-channel programmed DC/DC unit is in signal connection respectively with the heat sink, the constant current and constant voltage control circuit, and the voltage and current monitoring and protection unit; and connection ports of the power inverter are respectively electrically connected to the power grid and an input of the multi-channel programmed DC/DC unit to convert the current from the power grid from AC to DC to charge the battery or to convert the discharge current of the battery from DC to AC to feed back to the power grid, that is, when the battery is charged, the circuitry of the drive power board obtains the current AC/DC from the power inverter; and when the battery is discharged, the circuitry of the drive power board feeds the current DC/AC to the power inverter, thereby creating a function of energy recovery from the discharge circuitry.

The battery clamping movement mechanism comprises an upper probe board, an upper substrate, an upper probe board lifting mechanism, a lower probe board, a lower substrate, a lower probe board lifting mechanism, a battery tray support plate, and a connecting wire bundle, where the upper substrate and the lower substrate are mounted opposing each other and in parallel on the upper and lower inner surfaces of the corresponding work stations on the rack; a fixing rod is connected therebetween; the upper probe board lifting mechanism and the lower probe board lifting mechanism are respectively fixed to the opposite end faces of the upper substrate and the lower substrate; a movable end of the upper probe board lifting mechanism and a movable end of the lower probe board lifting mechanism are allowed to move in a direction facing or facing away from each other; the battery tray support plate is disposed on the fixing rod between the upper substrate and the lower substrate; the upper probe board and the lower probe board are horizontally arranged opposing each other on the upper and lower side of the battery tray support plate; probes of the upper probe board are kept to face probes of the lower probe board; the upper probe board is fixed to the movable end of the upper probe board lifting mechanism, and the lower probe board is fixed to the movable end of the lower probe board lifting mechanism, so that the upper probe board and the lower probe board move in a direction facing or facing away from each other as driven by the upper probe board lifting mechanism and the lower probe board lifting mechanism, to clamp or loose the positive and negative electrodes of the cylindrical lithium-ion battery between the two probe board; the probes of the upper probe board and the probes of the lower probe board are electrically connected to the power transmission end of the charge and discharge power box by the connecting wire bundle, to charge and discharge the cylindrical lithium-ion battery; and a control end of the upper probe board lifting mechanism and a control end of the lower probe board lifting mechanism are respectively electrically connected to a corresponding signal output of the controller.

The battery clamping movement mechanism is further provided with a constant temperature control device comprising a circulating air plate, a smoke and temperature sensor, and a fire extinguishing and spraying device, where the circulating air plate is arranged on the upper substrate and the lower substrate, and the circulating air plate is provided with several vent holes; several air inlets and outlets for ventilation are distributed on the upper probe board and the lower probe board, such that an external constant-temperature air source is introduced into the battery tray through the air inlets and outlets on the probe boards, to dispel the heat resulting from heat generation of the battery, and allow the battery to persistently work in a constant-temperature environment; a signal output of the smoke and temperature sensor is in signal connection with a signal input of the controller; and the fire extinguishing and spraying device comprises a fire extinguishing and spraying pipe, a control valve and a spraying head, in which the fire extinguishing and spraying pipe is disposed at the work station, a water inlet of the fire extinguishing and spraying pipe communicates with an external fire extinguishing agent source, and a water outlet of the fire extinguishing and spraying pipe is fitted with the spraying head for extinguishing the fire of the electronic tray at the work station; and the control valve is disposed on the spraying pipe, and a control end of the control valve is electrically connected to a corresponding signal output of the controller.

A stop block is disposed on the fixing rod between the lower probe board and the lower substrate, which is used to restrict the contact positions of the upper contact board and the lower probe board with the positive and negative electrodes of the cylindrical lithium ion battery sandwiched therebetween.

The electronic tray includes a base and an outer frame, in which a bottom of the outer frame is fixed to the base, such that the outer frame and the base enclose a cavity for holding the cylindrical lithium ion battery, and the base is provided with a plurality of battery containers for vertically positioning the cylindrical lithium-ion battery, where each battery container is provided with a corresponding positioning hole through which the probe of the lower probe board runs.

A tray ID number is provided on the base or the outer frame.

The battery tray is injection molded with a flame retardant material, and can carry 256-400 batteries at a time. The battery is placed upright in the battery tray to protect the battery body from damage during transport. This form of tray utilizes the flat space to the highest extent by taking full advantage of the high height and small diameter of the cylindrical lithium-ion battery, thereby saving the floor space occupied during production and storage. Moreover, during the production, the transfer efficiency and safety are also greatly improved by using the battery tray as a carrier.

During operation, the battery tray is placed at a designated position on the battery tray support plate by an automatic handling device (such as a stacker), the probe board lifting mechanisms lower the upper probe board to a defined position, and raise the lower probe board to a defined position, such that the contact surfaces of the upper and lower probe boards are in close contact with the positive and negative electrodes of the battery. A set compression process is initiated, and operation is started by energization by the connecting wire bundle. At the same time, the circulating air plate introduces the external constant temperature air source through the ventilation structure on the probe board to the battery tray, to dispel heat resulting from heat generation of the battery, so that the battery is maintained to work in a constant-temperature environment persistently. When the battery is on fire, the smoke and temperature sensor alarms and automatically initiates a fire extinguishing and spraying measure.

The present invention has the beneficial effects that the equipment can complete the formation and capacity grading processes of cylindrical lithium ion batteries, and the constant temperature and safety functions of the equipment can effectively improve the battery quality and the safety of the system.

DESCRIPTION OF THE EMBODIMENTS

The present invention will be further described below with reference to the accompanying drawings.

Referring to the accompanying drawings:

Embodiment 1

The formation capacity-grading equipment for a cylindrical lithium-ion battery according to the present invention comprises a rack 1, a charge and discharge power box 2 for charging and discharging the cylindrical lithium-ion battery, a battery clamping mechanism 3 for clamping the positive and negative electrodes of the cylindrical lithium-ion battery, a battery tray 4 for placing the cylindrical lithium-ion battery, and a controller, where the rack is provided with, from top to bottom, several layers of work stations for formation and capacity grading of the battery; the charge and discharge power box and the battery clamping mechanisms are provided at each layer of the work stations; a power transmission end of the charge and discharge power box is electrically connected to a power transmission end of the battery clamping mechanism; and a control end of the charge and discharge power box and a control end of the battery clamping mechanism are in signal connection respectively with a signal transmission port of the controller, to enable the control over the charge and discharge power box and the battery clamping mechanism by the controller.

The charge and discharge power box 2 comprises a power chassis 21, an electronic circuit, a control unit board 22, a drive power board 23, an auxiliary working power 24 of the system for enabling the operation of the electronic circuit, a power inverter 25 with bidirectional flow and conversion capability between AC and DC, and a cooling fan 26, where the electronic circuit, the drive power board, the control unit board, the auxiliary working power of the system, the power inverter and the cooling fan are all arranged in the power chassis, and the control unit board is provided on the drive power board; a power transmission end of the electronic circuit is electrically connected to a power transmission end of the auxiliary working power of the system; the electronic circuit, the drive power board, the auxiliary working power of the system and are respectively electrically connected to the control unit board; the control unit board is in bidirectional signal connection with controller via an interface communication board; a signal transmission end of the drive power board is in signal connection with a signal transmission port of the power inverter; an air outlet of the cooling fan faces toward the outside of the rack, and a control end of the cooling fan is electrically connected to a signal output of the controller for cooling the components in the rack.

Figure 1A:
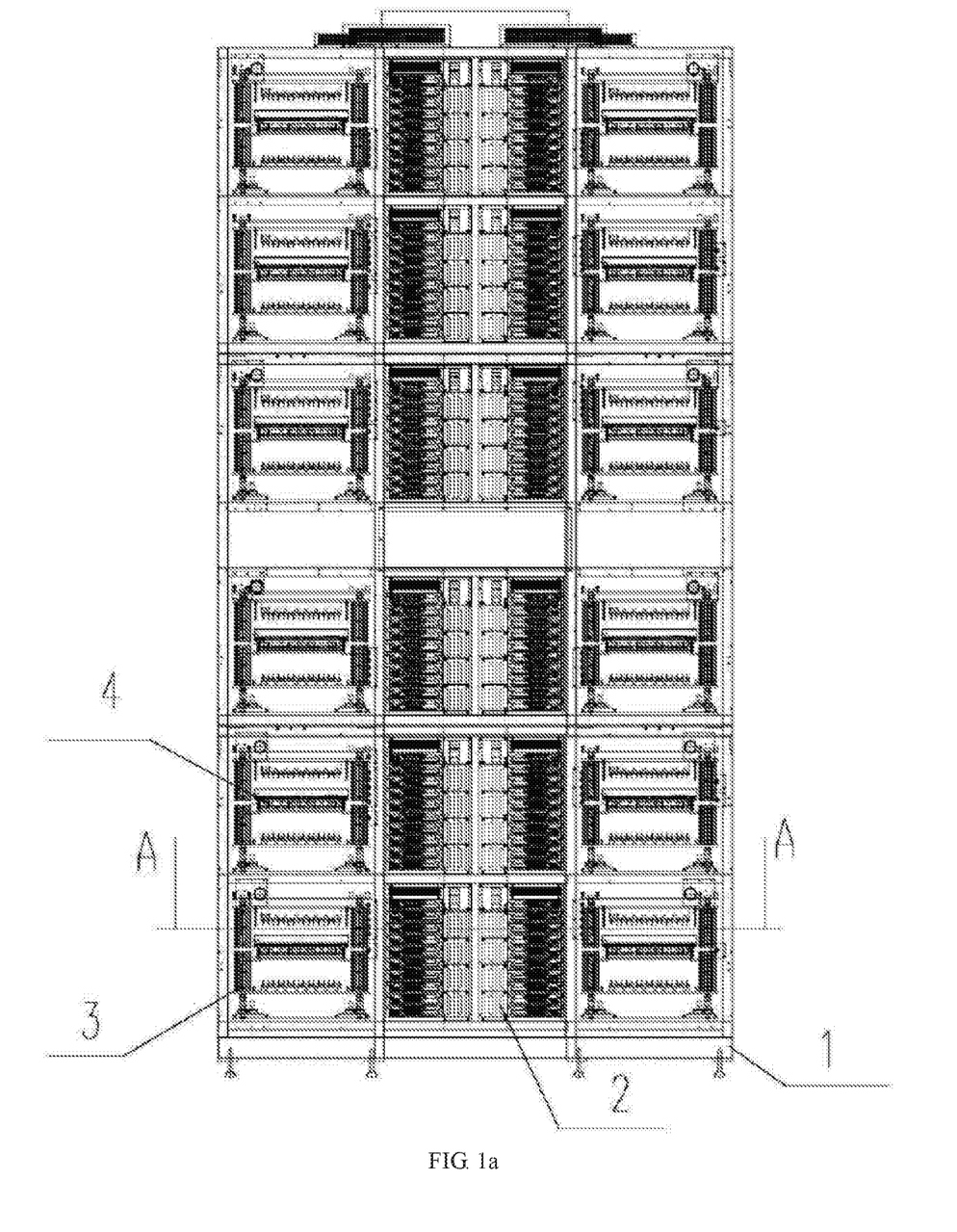
FIG. 1a is a front view showing the structure of the present invention.
Figure 1B:
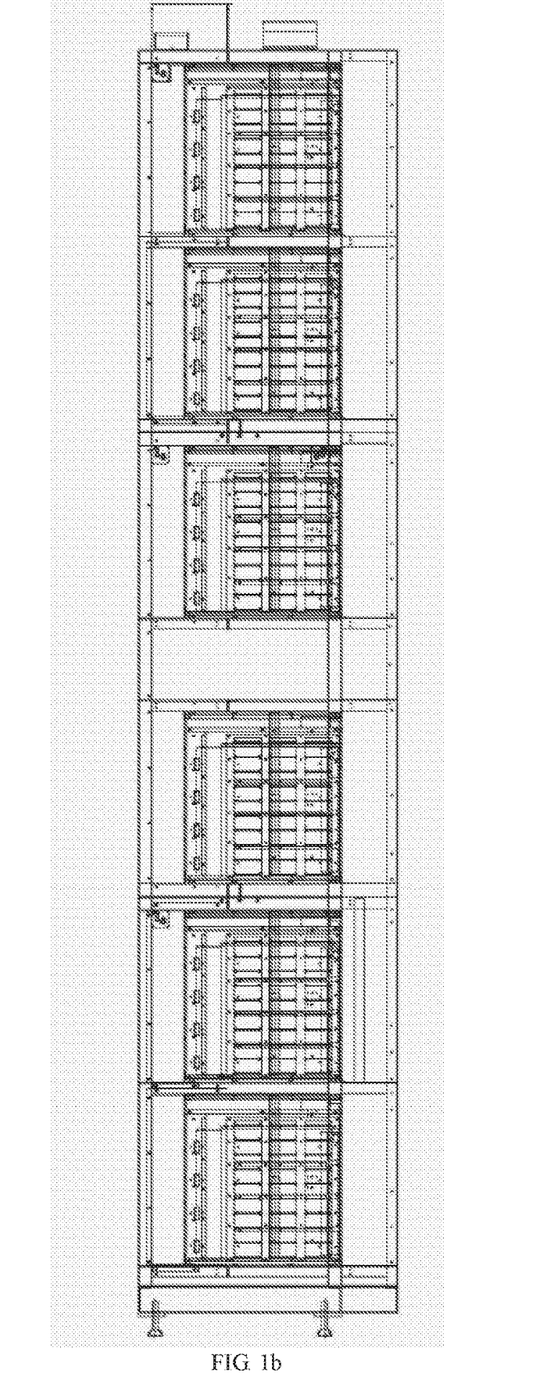
FIG. 1b is a side view showing the structure of the present invention.
Figure 1C:
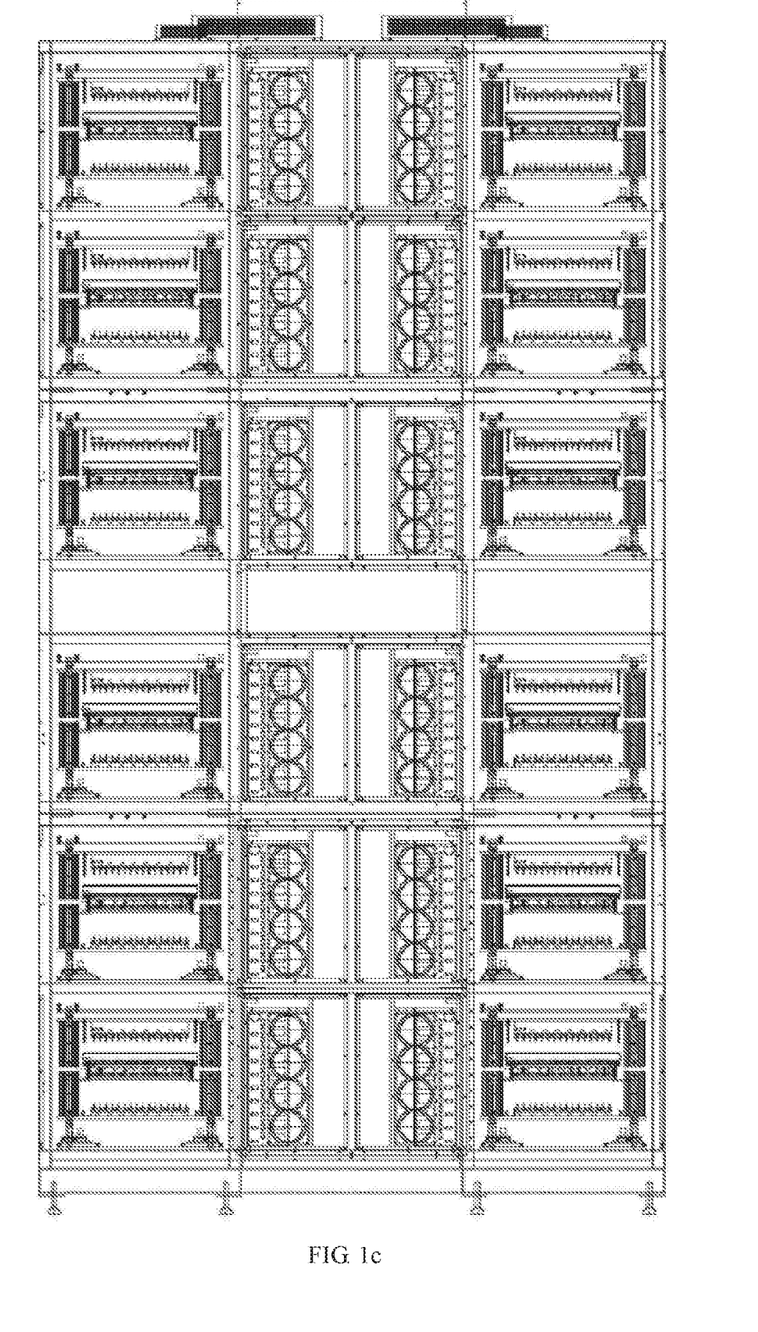
FIG. 1c is a rear view showing the structure of the present invention.
Figure 1D:
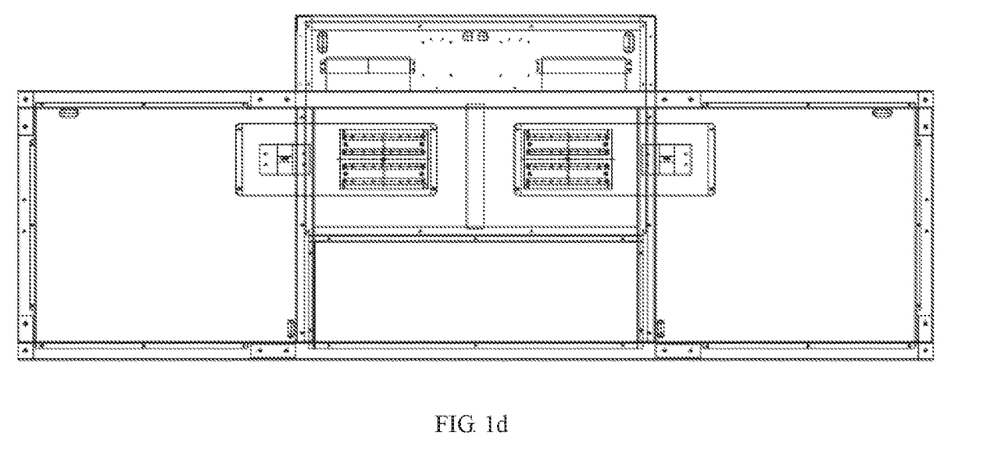
FIG. 1d is a top view showing the structure of the present invention.
Figure 2A:
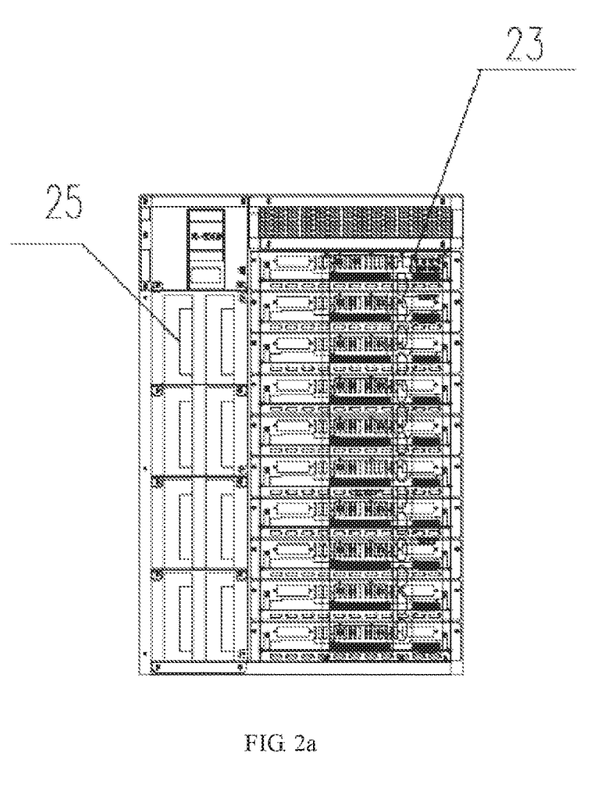
FIG. 2a is a front view showing a charge and discharge power box of the present invention.
Figure 2B:
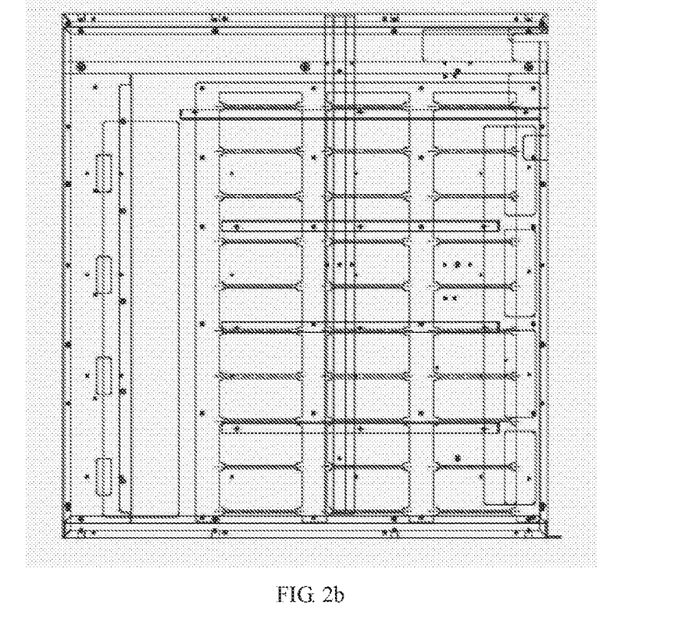
FIG. 2b is a top view showing a charge and discharge power box of the present invention.
Figure 2C:
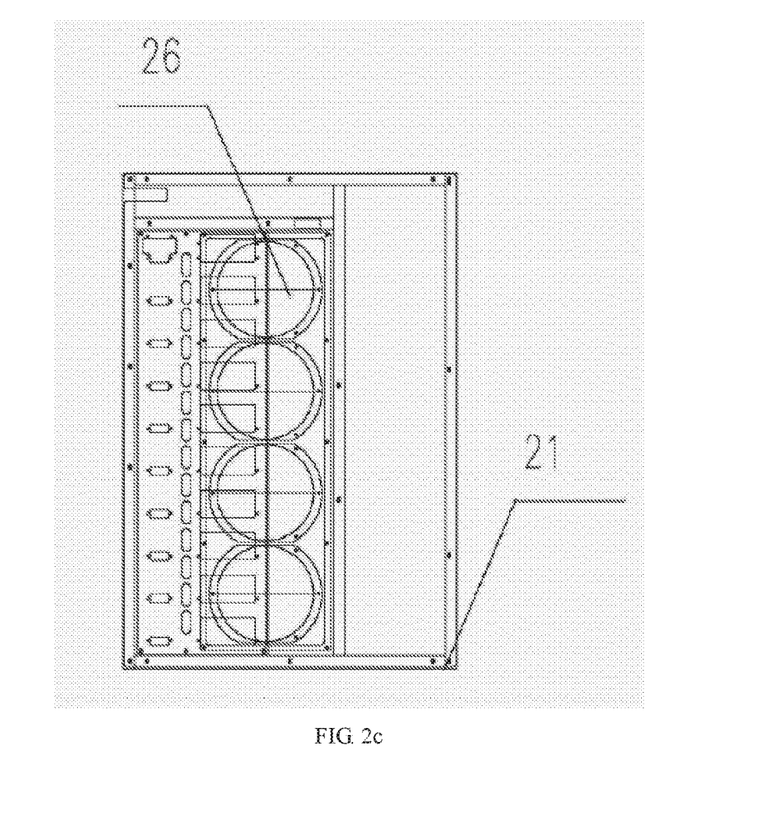
FIG. 2c is a right side view showing a charge and discharge power box of the present invention.

The electronic circuit comprises a bidirectional DC/DC unit for charging and discharging a single-cell cylindrical lithium-ion battery, a real-time high-precision high-speed sampling circuit for battery voltage and charge and discharge current, a charge and discharge constant-voltage control circuit subjected to precise control, a charge and discharge constant-current control circuit subjected to precise control, a real-time monitoring and protection unit, and a pneumatic component control and sensor sampling control circuit built in the battery clamping motion mechanism, where a power supply end of each component in the electronic circuit and the power grid are respectively connected to a power transmission end of the auxiliary power supply of the system.

The bidirectional DC/DC unit is a power loop directly connected to the battery, and the sampling circuit adjusts the state of the power loop through the control circuit by collecting the battery voltage and the charge and discharge current, thereby completing a controlled charge and discharge process. The monitoring and protection unit performs protections required for controlling the pneumatic component by sampling the sensor signal and the battery voltage and current signals. These unit circuits are integrated onto a PCB integration or physically connected by wires.

Figure 2D:
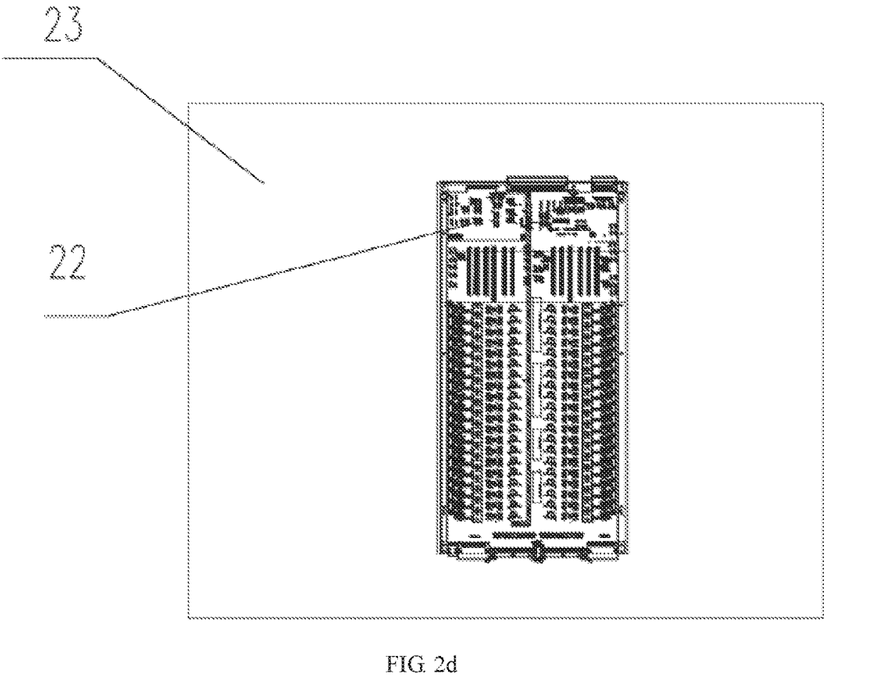
FIG. 2d is a schematic view showing the position on a drive power board of a control unit board for a charge and discharge power box of the present invention.
Figure 2E:
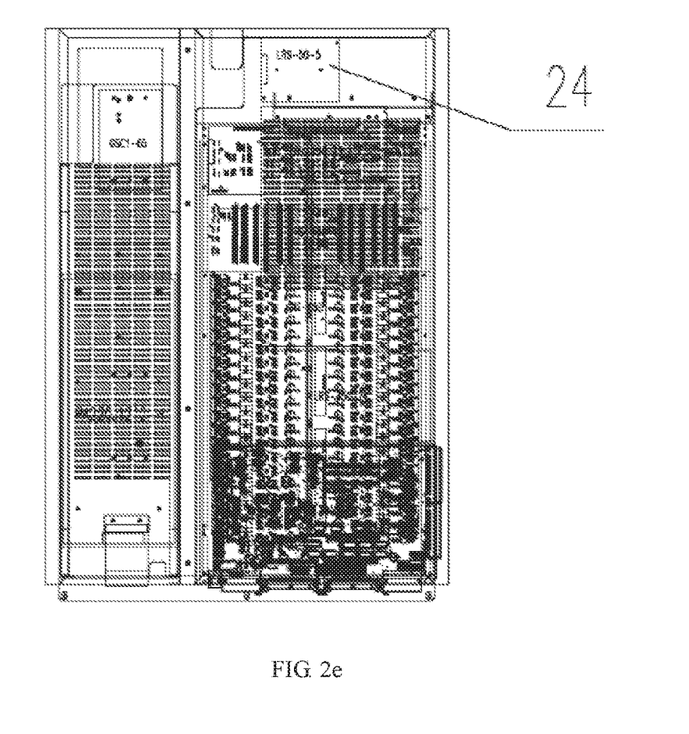
FIG. 2e is a front view showing a charge and discharge power box of the present invention.

The drive power board 23 comprises a multi-channel programmed DC/DC unit 231, a voltage and current monitoring and protection unit 232, a heat sink 233, and a constant current and constant voltage control circuit 234, where the multi-channel programmed DC/DC unit is in signal connection respectively with the heat sink, the constant current and constant voltage control circuit, and the voltage and current monitoring and protection unit; and connection ports of the power inverter are respectively electrically connected to the power grid and an input of the multi-channel programmed DC/DC unit to convert the current from the power grid from AC to DC to charge the battery or to convert the discharge current of the battery from DC to AC to feed back to the power grid, that is, when the battery is charged, the circuitry of the drive power board obtains the current AC/DC from the power inverter; and when the battery is discharged, the circuitry of the drive power board feeds the current DC/AC to the power inverter, thereby creating a function of energy recovery from the discharge circuitry.

Figure 3A:
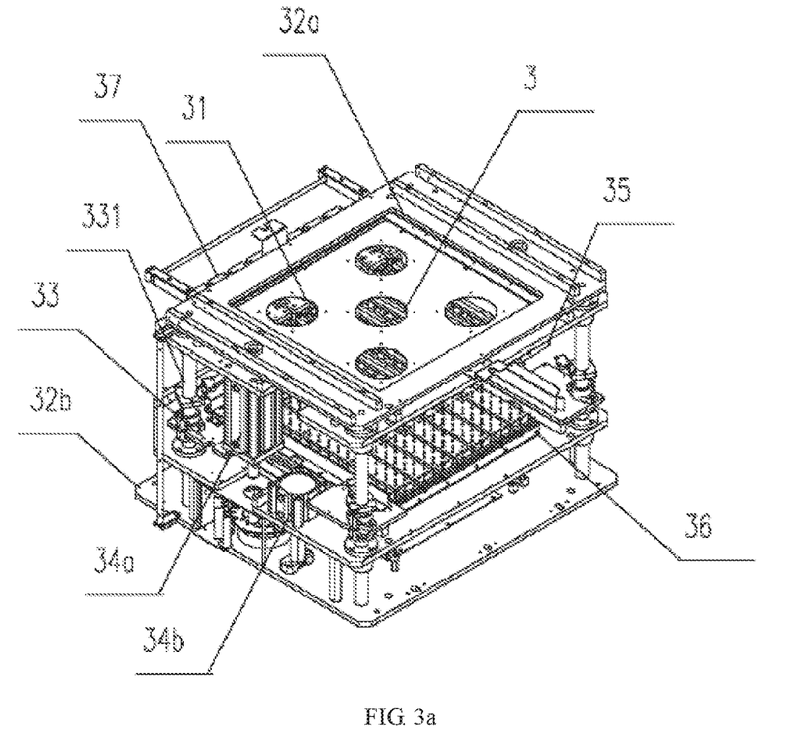
FIG. 3a is a schematic view showing the component structure in a battery tray clamping movement mechanism of the present invention.
Figure 3B:
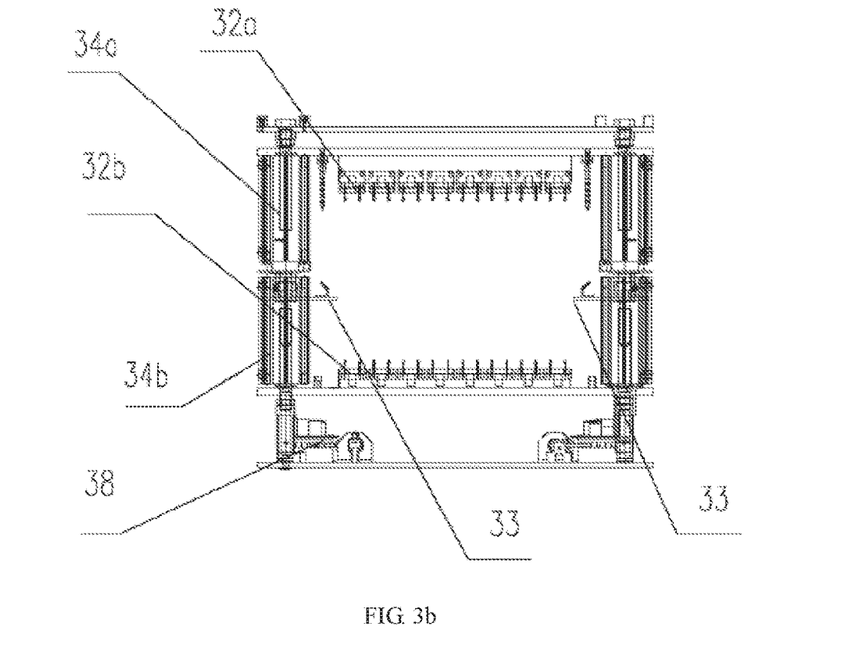
FIG. 3b is a front view showing the components in a battery tray clamping movement mechanism of the present invention.
Figure 3C:
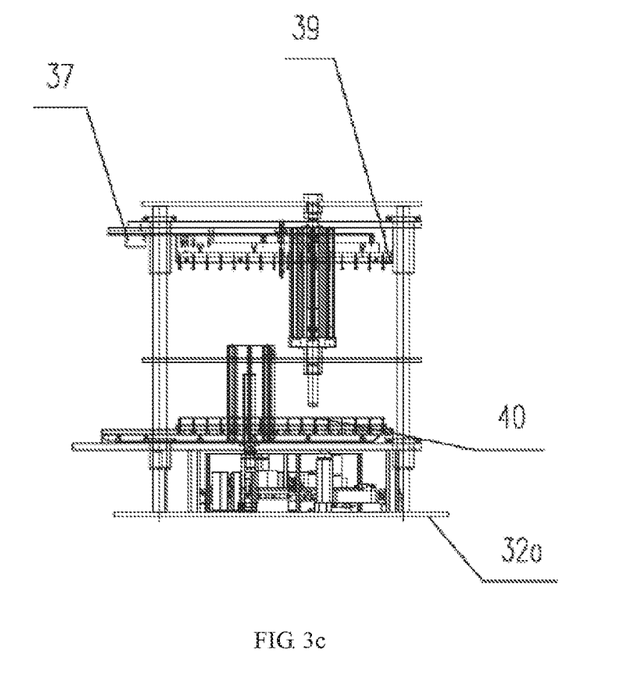
FIG. 3c is a side view showing the components in a battery tray clamping movement mechanism of the present invention.

The battery clamping movement mechanism 3 comprises an upper probe board 35, an upper substrate 32a, an upper probe board lifting mechanism 34a, a lower probe board 36, a lower substrate 32b, a lower probe board lifting mechanism 34b, a battery tray support plate 33, and a connecting wire bundle 37, where the upper substrate and the lower substrate are mounted opposing each other and in parallel on the upper and lower inner surfaces of the corresponding work stations on the rack; a fixing rod 331 is connected therebetween; the upper probe board lifting mechanism and the lower probe board lifting mechanism are respectively fixed to the opposite end faces of the upper substrate and the lower substrate; a movable end of the upper probe board lifting mechanism and a movable end of the lower probe board lifting mechanism are allowed to move in a direction facing or facing away from each other; the battery tray support plate is disposed on the fixing rod between the upper substrate and the lower substrate; the upper probe board and the lower probe board are horizontally arranged opposing each other on the upper and lower side of the battery tray support plate; probes of the upper probe board are kept to face probes of the lower probe board: the upper probe board is fixed to the movable end of the upper probe board lifting mechanism, and the lower probe board is fixed to the movable end of the lower probe board lifting mechanism, so that the upper probe board and the lower probe board move in a direction facing or facing away from each other as driven by the upper probe board lifting mechanism and the lower probe board lifting mechanism, to clamp or loose the positive and negative electrodes of the cylindrical lithium-ion battery between the two probe board; the probes of the upper probe board and the probes of the lower probe board are electrically connected to the power transmission end of the charge and discharge power box by the connecting wire bundle, to charge and discharge the cylindrical lithium-ion battery; and a control end of the upper probe board lifting mechanism and a control end of the lower probe board lifting mechanism are respectively electrically connected to a corresponding signal output of the controller.

Figure 3D:
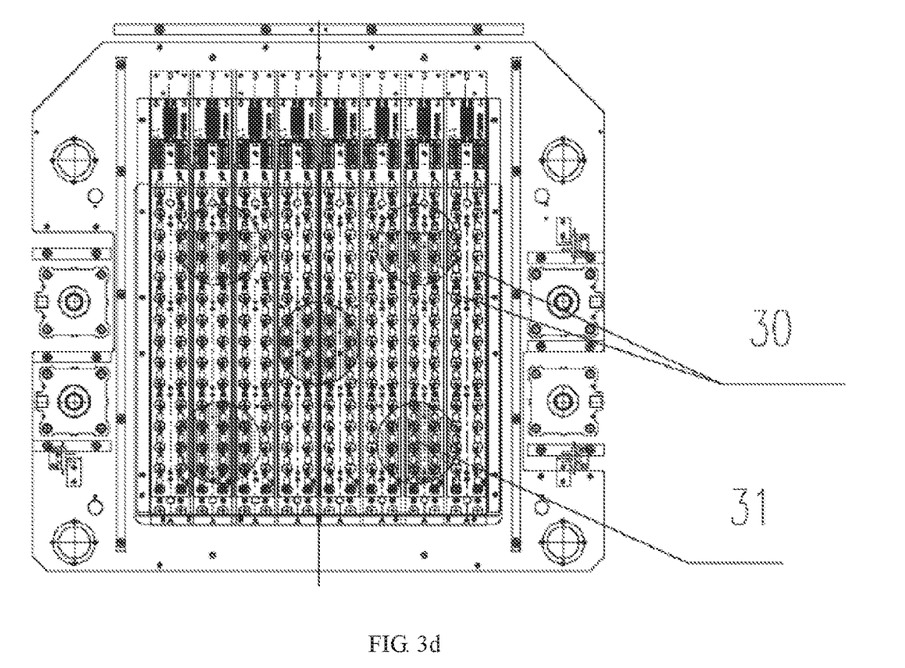
FIG. 3d is a schematic view showing vent holes on a probe board in a battery tray clamping movement mechanism of the present invention.

The battery clamping movement mechanism is further provided with a constant temperature control device comprising a circulating air plate 31, a smoke and temperature sensor 39, and a fire extinguishing and spraying device 40, where the circulating air plate is arranged on the upper substrate and the lower substrate, and the circulating air plate is provided with several vent holes 30; several air inlets and outlets for ventilation are distributed on the upper probe board and the lower probe board, such that an external constant-temperature air source is introduced into the battery tray through the air inlets and outlets on the probe boards, to dispel the heat resulting from heat generation of the battery, and allow the battery to persistently work in a constant-temperature environment; a signal output of the smoke and temperature sensor is in signal connection with a signal input of the controller; and the fire extinguishing and spraying device comprises a fire extinguishing and spraying pipe, a control valve and a spraying head, in which the fire extinguishing and spraying pipe is disposed at the work station, a water inlet of the fire extinguishing and spraying pipe communicates with an external fire extinguishing agent source, and a water outlet of the fire extinguishing and spraying pipe is fitted with the spraying head for extinguishing the fire of the electronic tray at the work station; and the control valve is disposed on the spraying pipe, and a control end of the control valve is electrically connected to a corresponding signal output of the controller.

A stop block 38 is disposed on the fixing rod between the lower probe board and the lower substrate, which is used to restrict the contact positions of the upper contact board and the lower probe board with the positive and negative electrodes of the cylindrical lithium ion battery sandwiched therebetween.

Figure 4A:
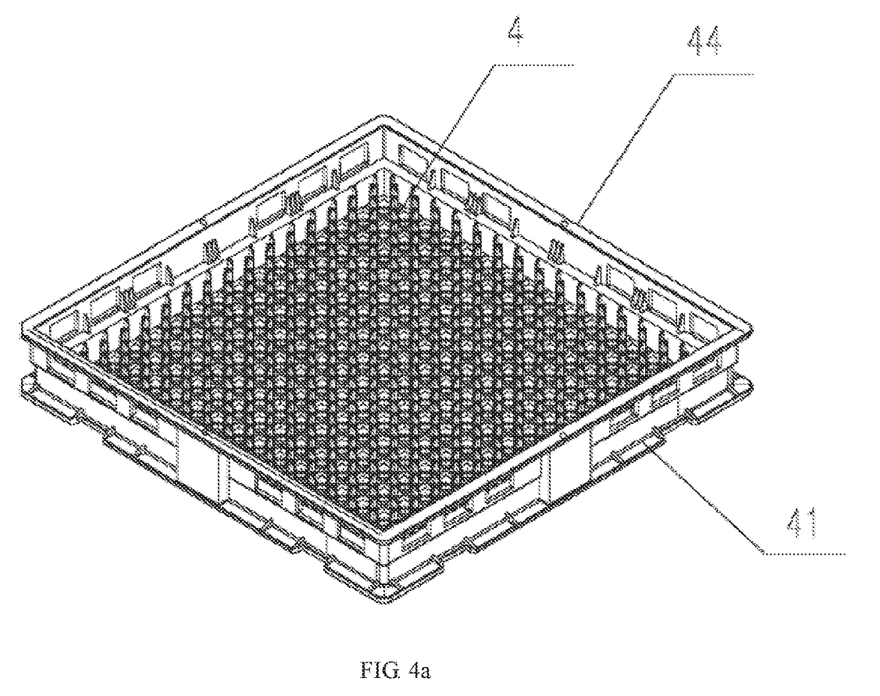
FIG. 4a is a schematic view showing the structure of a battery tray of the present invention.
Figure 4B:
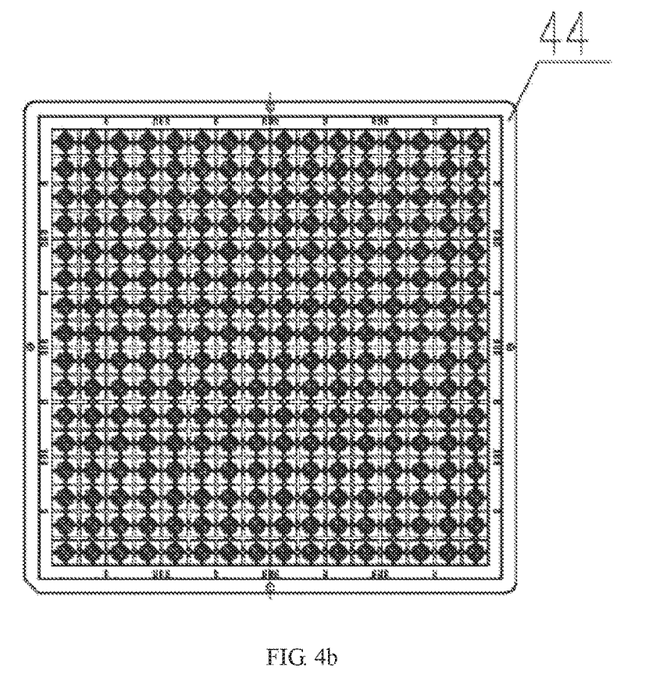
FIG. 4b is a front view showing a battery tray of the present invention.
Figure 4C:
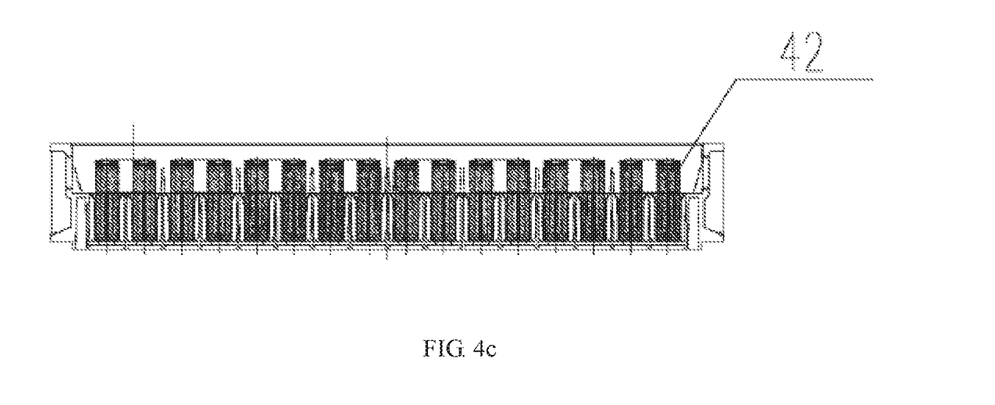
FIG. 4c is a side view showing a battery tray of the present invention.

The electronic tray 4 comprises a base 41 and an outer frame 44, in which a bottom of the outer frame is fixed to the base, such that the outer frame and the base enclose a cavity for holding the cylindrical lithium ion battery 42, and the base is provided with a plurality of battery containers for vertically positioning the cylindrical lithium-ion battery, where each battery container is provided with a corresponding positioning hole through which the probe of the lower probe board runs.

Figure 4D:
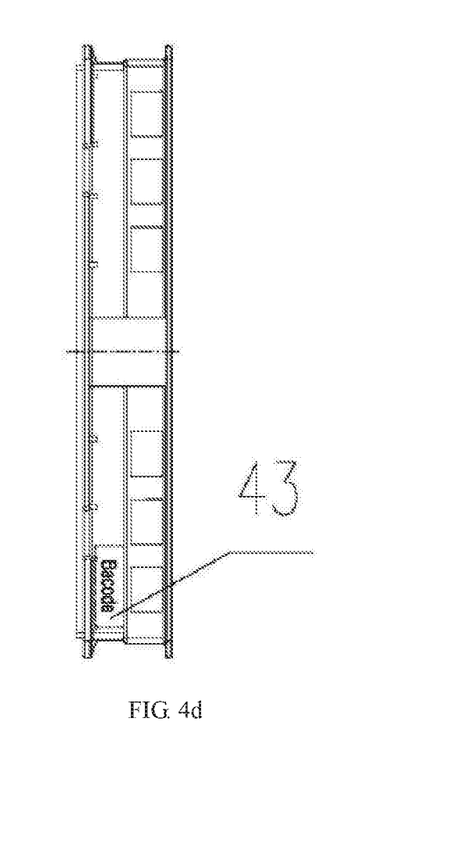
FIG. 4d is a schematic view showing an ID number of a battery tray of the present invention.

A tray ID number 43 is provided on the base or the outer frame.

The battery tray is injection molded with a flame retardant material, and can carry 256-400 batteries at a time. The battery is placed upright in the battery tray to protect the battery body from damage during transport. This form of tray utilizes the flat space to the highest extent by taking full advantage of the high height and small diameter of the cylindrical lithium-ion battery, thereby saving the floor space occupied during production and storage. Moreover, during the production, the transfer efficiency and safety are also greatly improved by using the battery tray as a carrier.

During operation, the battery tray is placed at a designated position on the battery tray support plate by an automatic handling device (such as a stacker), and the probe board lifting mechanisms lower the upper probe board to a defined position, and raise the lower probe board to a defined position, such that the contact surfaces of the upper and lower probe boards are in close contact with the positive and negative electrodes of the battery. A set compression process is initiated, and operation is started by energization by the connecting wire bundle. At the same time, the circulating air plate introduces the external constant temperature air source through the ventilation structure on the probe board to the battery tray, to dispel heat resulting from heat generation of the battery, so that the battery is maintained to work in a constant-temperature environment persistently. When the battery is on fire, the smoke and temperature sensor alarms and automatically initiates a fire extinguishing and spraying measure.

Embodiment 2

In a cylindrical lithium-ion battery formation capacity-grading device according to the present invention, the battery tray is placed in the battery clamping movement mechanism when it is working, and is placed outside the rack when it is not working. The charge and discharge power box and the battery clamping movement mechanism are electrically connected to each other by a connecting wire bundle in the rack.

The charge and discharge power box is an energy recovery charge and discharge power box, which can simultaneously charge and discharge 256-400 batteries. The electronic circuit comprises: a bidirectional DC/DC unit for charging and discharging a single-cell cylindrical lithium-ion battery, a real-time high-precision high-speed sampling circuit for battery voltage and charge and discharge current, a charge and discharge constant-voltage control circuit subjected to precise control, a charge and discharge constant-current control circuit subjected to precise control, a real-time monitoring and protection unit, and a pneumatic component control and sensor sampling control circuit built in the battery clamping motion mechanism, where the control unit board is provided with a communication and control interface, and can perform data interaction with the control software set in the controller according to a predetermined communication protocol, collect real-time data of the battery, control the charge and discharge process of the battery, protect the battery found to have abnormal data or the battery indicated to be abnormal by the control software to avoid safety hazard, and control the battery clamping movement mechanism as needed. The power inverter is responsible for connecting the power grid and the DC/DC unit, providing the battery charge energy and collecting the battery discharge energy and feeding it to the AC end. During charge, the energy from the power grid is converted from AC to DC and stepped down. During discharge, the battery energy is boosted, converted from DC to AC, and fed to the AC end. The auxiliary power supply of the system is connected to the power grid and a power supply end of each component in the electronic circuit, and provides the required power for each chip and device.

The battery tray is placed at a designated position on the battery tray support plate by an automatic handling device (such as a stacker), and the probe board lifting mechanisms lower the upper probe board to a defined position, and raise the lower probe board to a defined position, such that the contact surfaces of the upper and lower probe boards are in close contact with the positive and negative electrodes of the battery. A set compression process is initiated, and operation is started by energization by the connecting wire bundle. At the same time, the circulating air plate introduces the external constant temperature air source through the ventilation structure on the probe board to the battery tray, to dispel heat resulting from heat generation of the battery, so that the battery is maintained to work in a constant-temperature environment persistently. When the battery is on fire, the smoke and temperature sensor alarms and automatically initiates a fire extinguishing and spraying measure.

The battery tray is provided with 256-400 battery containers according to the manufacturing requirements, and the battery is placed vertically.

The controller communicates via the control unit board in the charge and discharge power box, sends the formation and capacity grading conditions of the lithium ion battery to control unit board, periodically collects the voltage and current data of the battery and the device status, saves and monitors the battery data, and sends the data to the Manufacturing Execution System (MES). The control software will compare and analyze the collected battery data based on a preset risk data model, and notify the single chip microcomputer to take protective measures for the qualified battery at risk. The control software can manage several charge and discharge power boxes simultaneously.

Several drive power boards are disposed in the power box 2, each board has several charge and discharge circuits thereon, and the charge and discharge circuit is connected to the power inverter. When the lithium battery is charged, the power loop obtains energy through the forward working of the power inverter, and charges it to the lithium battery; and when the lithium battery is discharged, the power loop will feed the energy from the lithium battery to the AC end through the reverse working of the power inverter to realize the energy recovery and energy saving.

The control circuit board 22 in the chassis is connected to the control software through the communication interface, receives the control over the charge and discharge function of the battery, and records the various electrical parameter information of the lithium battery and feed it back to the controller. The battery tray 4 can hold 256-400 cylindrical lithium batteries 42, and the ID number 43 on the battery tray 4 is the carrier number of 256-400 lithium batteries 42 in the tray, which is used for process management. After the battery tray 4 is loaded with the lithium battery 42, the battery tray is placed on the battery tray support plate 33 by an automatic handling device (such as a stacker), the probe board lifting mechanisms 34 lower the upper probe board 35 to a position defined by the stop block 38, and raise the lower probe board 36 to a position defined by the stop block 38, such that the contact surfaces of the upper and lower probe boards are in close contact with the positive and negative electrodes of the battery. A set compression process is initiated, and operation is started by energization by the connecting wire bundle. At the same time, the circulating air plate 31 introduces the external constant temperature air source through the ventilation structure on the probe board 35 to the region of the battery tray 4, to dispel heat resulting from heat generation of the battery, so that the battery is maintained to work in a constant-temperature environment persistently. When the battery is on fire, the smoke and temperature sensor 39 alarms, and the fire extinguishing and spraying pipe and the spraying head 40 automatically initiates a fire extinguishing and spraying measure to spray an extinguishing agent to the region of the battery tray.

The description in the embodiments of the present specification is merely illustrative of the implementation forms of the inventive concept, and the scope of protection of the present invention should not be construed as being limited to the specific forms stated in the embodiments. The scope of protection of the present invention also includes equivalent technical means suggested to those skilled in the art in accordance with the inventive concept.

What is claimed is:

1. A formation capacity-grading equipment for a cylindrical lithium-ion battery, comprising a rack, a charge and discharge power box for charging and discharging the cylindrical lithium-ion battery, a battery clamping mechanism for clamping the positive and negative electrodes of the cylindrical lithium-ion battery, a battery tray for placing the cylindrical lithium-ion battery, and a controller, wherein the rack is provided with, from top to bottom, several layers of work stations for formation and capacity grading of the battery; the charge and discharge power box and the battery clamping mechanisms are provided at each layer of the work stations; a power transmission end of the charge and discharge power box is electrically connected to a power transmission end of the battery clamping mechanism; and a control end of the charge and discharge power box and a control end of the battery clamping mechanism are in signal connection respectively with a signal transmission port of the controller, to enable the control over the charge and discharge power box and the battery clamping mechanism by the controller.

2. The formation capacity-grading equipment for a cylindrical lithium-ion battery according to claim 1, wherein the charge and discharge power box comprises a power chassis, an electronic circuit, a control unit board, a drive power board, an auxiliary working power of the system, a power inverter with bidirectional flow and conversion capability between AC and DC, and a cooling fan, where the electronic circuit, the drive power board, the control unit board, the auxiliary working power of the system, the power inverter and the cooling fan are all arranged in the power chassis, and the control unit board is provided on the drive power board; the electronic circuit, the drive power board, the auxiliary working power of the system and are respectively electrically connected to the control unit board; the control unit board is in bidirectional signal connection with controller via an interface communication board; a signal transmission end of the drive power board is in signal connection with a signal transmission port of the power inverter; an air outlet of the cooling fan faces toward the outside of the rack, and a control end of the cooling fan is electrically connected to a signal output of the controller for cooling the components in the rack.

3. The formation capacity-grading equipment for a cylindrical lithium-ion battery according to claim 2, wherein the electronic circuit comprises a bidirectional DC/DC unit for charging and discharging a single-cell cylindrical lithium-ion battery, a real-time high-precision high-speed sampling circuit for battery voltage and charge and discharge current, a charge and discharge constant-voltage control circuit subjected to precise control, a charge and discharge constant-current control circuit subjected to precise control, a real-time monitoring and protection unit, and a pneumatic component control and sensor sampling control circuit built in the battery clamping motion mechanism.

4. The formation capacity-grading equipment for a cylindrical lithium-ion battery according to claim 2, wherein the drive power board comprises a multi-channel programmed DC/DC unit, a voltage and current monitoring and protection unit, a heat sink, and a constant-current and constant-voltage control circuit, where the multi-channel programmed DC/DC unit is in signal connection respectively with the heat sink, the constant-current and constant-voltage control circuit, and the voltage and current monitoring and protection unit; and connection ports of the power inverter are respectively electrically connected to the power grid and an input of the multi-channel programmed DC/DC unit to convert the current from the power grid from AC to DC to charge the battery or to convert the discharge current of the battery from DC to AC to feed back to the power grid, that is, when the battery is charged, the circuitry of the drive power board obtains the current AC/DC from the power inverter; and when the battery is discharged, the circuitry of the drive power board feeds the current DC/AC to the power inverter, thereby creating a function of energy recovery from the discharge circuitry.

5. The formation capacity-grading equipment for a cylindrical lithium-ion battery according to claim 1, wherein the battery clamping movement mechanism comprises an upper probe board, an upper substrate, an upper probe board lifting mechanism, a lower probe board, a lower substrate, a lower probe board lifting mechanism, a battery tray support plate, and a connecting wire bundle, where the upper substrate and the lower substrate are mounted opposing each other and in parallel on the upper and lower inner surfaces of the corresponding work stations on the rack; a fixing rod is connected therebetween; the upper probe board lifting mechanism and the lower probe board lifting mechanism are respectively fixed to the opposite end faces of the upper substrate and the lower substrate; a movable end of the upper probe board lifting mechanism and a movable end of the lower probe board lifting mechanism move in a direction facing or facing away from each other; the battery tray support plate is disposed on the fixing rod between the upper substrate and the lower substrate; the upper probe board and the lower probe board are horizontally arranged opposing each other on the upper and lower side of the battery tray support plate; probes of the upper probe board are kept to face probes of the lower probe board; the upper probe board is fixed to the movable end of the upper probe board lifting mechanism, and the lower probe board is fixed to the movable end of the lower probe board lifting mechanism, so that the upper probe board and the lower probe board move in a direction facing or facing away from each other as driven by the upper probe board lifting mechanism and the lower probe board lifting mechanism, to clamp or loose the positive and negative electrodes of the cylindrical lithium-ion battery between the two probe board; the probes of the upper probe board and the probes of the lower probe board are electrically connected to the power transmission end of the charge and discharge power box by the connecting wire bundle, to charge and discharge the cylindrical lithium-ion battery; and a control end of the upper probe board lifting mechanism and a control end of the lower probe board lifting mechanism are respectively electrically connected to a corresponding signal output of the controller.

6. The formation capacity-grading equipment for a cylindrical lithium-ion battery according to claim 5, wherein the battery clamping movement mechanism is further provided with a constant temperature control device comprising a circulating air plate, a smoke and temperature sensor, and a fire extinguishing and spraying device, where the circulating air plate is arranged on the upper substrate and the lower substrate, and the circulating air plate is provided with several vent holes; several air inlets and outlets for ventilation are distributed on the upper probe board and the lower probe board, such that an external constant-temperature air source is introduced into the battery tray through the air inlets and outlets on the probe boards, to dispel the heat resulting from heat generation of the battery, and allow the battery to persistently work in a constant-temperature environment; a signal output of the smoke and temperature sensor is in signal connection with a signal input of the controller; and the fire extinguishing and spraying device comprises a fire extinguishing and spraying pipe, a control valve and a spraying head, in which the fire extinguishing and spraying pipe is disposed at the work station, a water inlet of the fire extinguishing and spraying pipe communicates with an external fire extinguishing agent source, and a water outlet of the fire extinguishing and spraying pipe is fitted with the spraying head for extinguishing the fire of the electronic tray at the work station; and the control valve is disposed on the spraying pipe, and a control end of the control valve is electrically connected to a corresponding signal output of the controller.

7. The formation capacity-grading equipment for a cylindrical lithium-ion battery according to claim 6, wherein a stop block is disposed on the fixing rod between the lower probe board and the lower substrate, which is used to restrict the contact positions of the upper contact board and the lower probe board with the positive and negative electrodes of the cylindrical lithium ion battery sandwiched therebetween.

8. The formation capacity-grading equipment for a cylindrical lithium-ion battery according to claim 1, wherein the electronic tray comprises a base and an outer frame, in which a bottom of the outer frame is fixed to the base, such that the outer frame and the base enclose a cavity for holding the cylindrical lithium ion battery, and the base is provided with a plurality of battery containers for vertically positioning the cylindrical lithium-ion battery, where each battery container is provided with a corresponding positioning hole through which the probe of the lower probe board runs.

9. The cylindrical lithium-ion battery formation capacity-grading device according to claim 8, wherein a tray ID number is provided on the base or the outer frame.

10. The formation capacity-grading equipment for a cylindrical lithium-ion battery according to claim 1, wherein the battery clamping movement mechanism is further provided with a constant temperature control device comprising a circulating air plate, a smoke and temperature sensor, and a fire extinguishing and spraying device, where the circulating air plate is arranged on the upper substrate and the lower substrate, and the circulating air plate is provided with several vent holes; several air inlets and outlets for ventilation are distributed on the upper probe board and the lower probe board, such that an external constant-temperature air source is introduced into the battery tray through the air inlets and outlets on the probe boards, to dispel the heat resulting from heat generation of the battery, and allow the battery to persistently work in a constant-temperature environment; a signal output of the smoke and temperature sensor is in signal connection with a signal input of the controller; and the fire extinguishing and spraying device comprises a fire extinguishing and spraying pipe, a control valve and a spraying head, in which the fire extinguishing and spraying pipe is disposed at the work station, a water inlet of the fire extinguishing and spraying pipe communicates with an external fire extinguishing agent source, and a water outlet of the fire extinguishing and spraying pipe is fitted with the spraying head for extinguishing the fire of the electronic tray at the work station; and the control valve is disposed on the spraying pipe, and a control end of the control valve is electrically connected to a corresponding signal output of the controller.

11. The formation capacity-grading equipment for a cylindrical lithium-ion battery according to claim 10, wherein a stop block is disposed on the fixing rod between the lower probe board and the lower substrate, which is used to restrict the contact positions of the upper contact board and the lower probe board with the positive and negative electrodes of the cylindrical lithium ion battery sandwiched therebetween.

* * * * *